United States Patent [19]

Sakamoto et al.

[11] Patent Number: 4,831,317
[45] Date of Patent: May 16, 1989

[54] METHOD FOR CONTROLLING A SERVOMOTOR

[75] Inventors: Keiji Sakamoto, Hachioji; Toshio Kobayashi, Hino, both of Japan

[73] Assignee: Fanuc Ltd, Minamitsuru, Japan

[21] Appl. No.: 130,992

[22] PCT Filed: Feb. 14, 1987

[86] PCT No.: PCT/JP87/00096
§ 371 Date: Oct. 5, 1987
§ 102(e) Date: Oct. 5, 1987

[87] PCT Pub. No.: WO87/05167
PCT Pub. Date: Aug. 27, 1987

[30] Foreign Application Priority Data

Feb. 14, 1986 [JP] Japan .................. 61-29020

[51] Int. Cl.$^4$ .................................. G05B 11/28
[52] U.S. Cl. .................. 318/599; 388/811; 388/900; 388/906
[58] Field of Search .................. 318/599, 340

[56] References Cited

U.S. PATENT DOCUMENTS 4,623,827 11/1986 Ito ........................ 318/341

Primary Examiner—William M. Shoop, Jr.
Assistant Examiner—Saul M. Bergmann
Attorney, Agent, or Firm—Staas & Halsey

[57] ABSTRACT

In a method of controlling a servomotor, a high output can be fetched from the servomotor by a motor-current control unit of a simple construction, while protecting switching elements of the control unit against excess current. The deviation between a command current (Ir) for of a plurality of winding portions constituting an armature winding of each phase and a current (Ia, Ib) flowing through each winding portion is integrated by an integrating element (9, 9'). The current (Ia, Ib) is amplified by means of a proportional element (10, 10'), and the individual currents (Ia, Ib) are controlled for substantially independent and equal values by means of one PWM control section (3) operating in response to a control signal which is obtained by adding outputs from both the elements (9~10').

6 Claims, 3 Drawing Sheets

METHOD FOR CONTROLLING A SERVOMOTOR

BACKGROUND OF THE INVENTION

1. Technical Field

The present invention relates to a method for controlling a servomotor, and more particularly, to a drive control method for a servomotor, in which a high output can be fetched from the servomotor by means of a motor-current control unit of a simple construction.

2. Description of the Related Art

The recent mainstream of servomotor drive control is PWM control using semiconductor switching elements, such as power transistors, thyristors, etc. Also, there is a demand that a high output should be obtained from servomotors. In order to obtain a high output from a servomotor, a large current must be supplied to the semiconductor elements. It is difficult, however, to obtain semiconductor elements which permit a large current to be applied thereto. Even if a large current is allowed to flow through a semiconductor element, moreover, the semiconductor element has the property of generating heat in its active region, and hardly in its cut-off region and saturated region. Therefore, the calorific value of the semiconductor element increases in proportion to the chopping frequency, so that the chopping frequency must be lowered. If the chopping frequency is lowered, however, motor control inevitably becomes difficult. Thereupon, a tentative arrangement is provided such that each of the switching elements of a PWM control section is composed of a plurality of semiconductor elements, and the driving current of the servomotor is increased by reducing the currents flowing through the individual semiconductor elements. In such a case, however, current concentration in the semiconductor elements (or large current flow only in some of the semiconductor elements) is caused, so that the driving current cannot be increased in proportion to the number of parallel-connected semiconductor elements.

Conventionally, therefore, a high output is obtained by operating a plurality of motors in a parallel manner. In this case, however, it is necessary to mechanically connect the individual motors with one another and with an output shaft. This results in an increase in cost.

SUMMARY OF THE INVENTION

An object of the present invention is to provide a drive control method for a servomotor, in which a high output can be fetched from the servomotor while preventing switching elements of a motor-current control unit from being damaged by excess current.

Another object of the present invention is to provide a drive control method for a servomotor which can be effected by using a motor-current control unit of a simple construction.

A method for controlling a servomotor according to the present invention comprises steps of integrating the deviation between a command current for each of two or more independent winding portions and a current flowing through each of the winding portions, with use of an integrating element corresponding to each of the winding portions, the two or more winding portions constituting an armature winding of each phase of the servomotor; amplifying the currents flowing through the individual winding portions by means of proportional elements corresponding to the individual winding portions; obtaining the deviations between the outputs of the individual integrating elements and the outputs of the proportional elements corresponding thereto; obtaining a control signal by adding the individual deviations; and controlling the currents supplied to the indivudal winding portions for substantially independent and equal values by the use of one PWM control means responsive to the control signal.

Thus, according to the present invention, the control signal is obtained with use of the integrating element and the proportional element corresponding to each of the plurality of winding portions, which constitute the armature winding of each phase of the servomotor. Therefore, the current flowing through the individual winding portions can be controlled independently for equal values by the use of one PWM control means. Thus, a high output can be obtained from the servomotor, and besides, a motor-current control section can be simplified in construction and lowered in cost.

DESCRIPTION OF THE PREFERRED EMBODIMENTS

Figure 2:
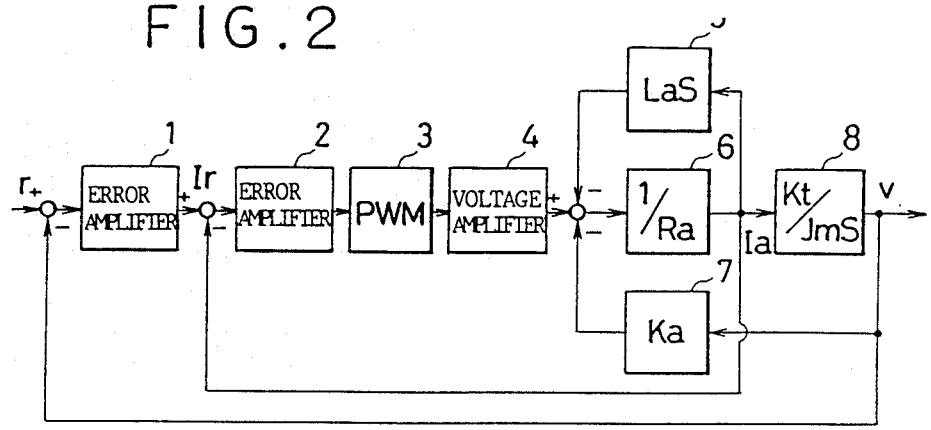
FIG. 2 is a block diagram showing a typical example of a speed control section of a DC servomotor.

Before describing the present invention, a typical example of speed control of a DC servomotor will be explained with reference to FIG. 2. FIG. 2 shows only those elements which are related to one phase of the motor. In FIG. 2, the difference between a speed command r delivered from an error register or the like and an actual speed V of the servomotor detected by a speed detector is amplified by an error amplifier 1, and is delivered as a current command Ir to an error amplifier 2. The difference between the current command Ir and a present drive current Ia detected by a current detector is amplified. Then, an armature winding of the servomotor is supplied with a drive current from a voltage amplifier 4, which is controlled by a PWM control section 3 operating in response to an output from the error amplifier 2. Numerals 5, 6 and 7 denote transfer functions based on an inductance La of the armature winding, a resistance Ra of the winding, and a back electromotive voltage constant Ka of the servomotor, respectively. Numeral 8 denotes a transfer function for conversion from an output torque of the servomotor to a speed. Symbols Kt and Jm designate a torque constant and a resultant moment of inertia of the servomotor and a load, respectively.

Figure 3:
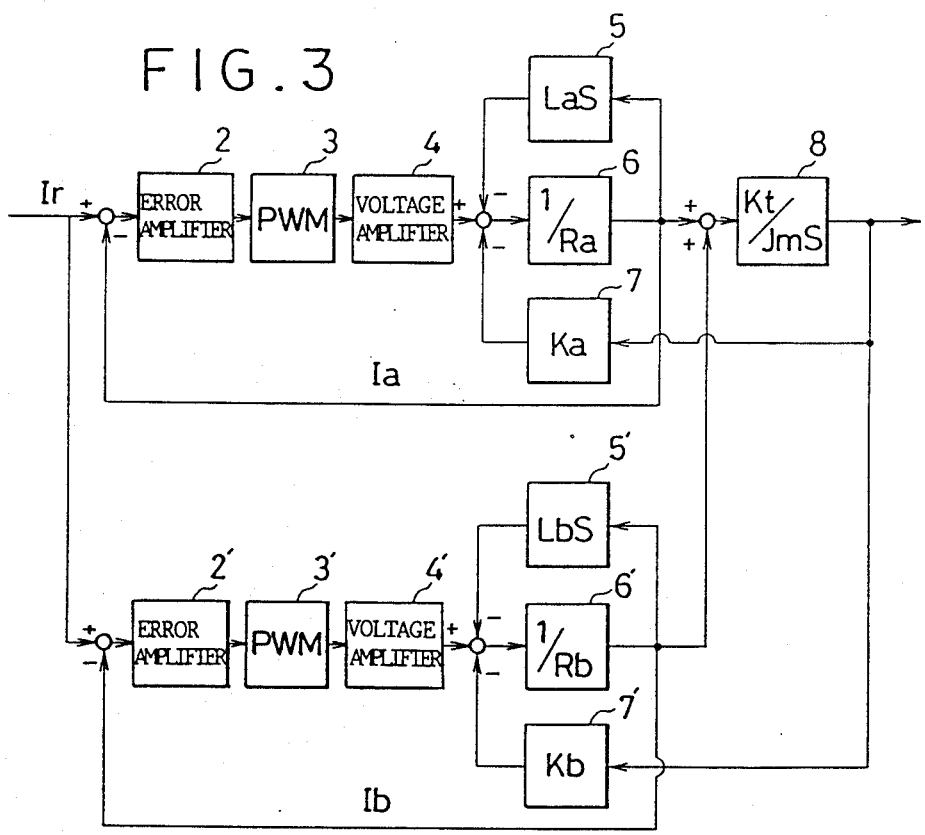
FIG. 3 is a block diagram showing an example of the arrangement of a current control section used for the control of a servomotor having an armature winding composed of a plurality of winding portions.

In order to increase the servomotor output without applying excess current to semiconductor elements of the PWM control section 3, the inventors hereof first devised an arrangement shown in FIG. 3, in which the armature winding of each phase of the motor is composed of two independent winding portions, and in which a PWM-controlled drive current is fed to each of the winding portions.

The two independent winding portions, which constitute each phase, are located relatively to the slots (not shown) of an armature so as to act equally on a rotor in phasic relation. Namely, the winding of each phase of a conventional servomotor is divided so that each phase includes two independent winding portions. The simplest way to attain this, for example, is to arrange to independent winding portions of the same phase in the same slot of the armature. Also when arranging two winding portions of the same phase in different slots, it is necessary only that the two winding portions be relatively located so as to act equally on the rotor.

In FIG. 3, elements 2 to 7 identical with the elements shown in FIG. 2 are arranged corresponding to a first winding portion, while similar elements 2' to 7' are arranged corresponding to a second winding portion. Symbols La, Ra, and Ka designate an inductance, resistance, and back electromotive voltage constant, respectively, at the first winding portion, the symbol Ia designates a current flowing through the first winding portion. Symbols Lb, Rb, and Kb designate an inductance, resistance, and back electromotive voltage constant at the second winding portion, and symbol Ib designates a current flowing through the second winding portion.

If error amplifiers 2 and 2', PWM control sections 3 and 3', voltage amplifiers 4 and 4', etc., are arranged in their corresponding winding portions, as shown in FIG. 3, the individual winding portions are controlled independently. Accordingly, there is no interference between the currents flowing through the winding portions, and this arrangement is equivalent to one which controls two motors. This arrangement is uneconomical, however, since it requires the error amplifiers, PWM control sections, and voltage amplifiers in pairs.

Figure 4:
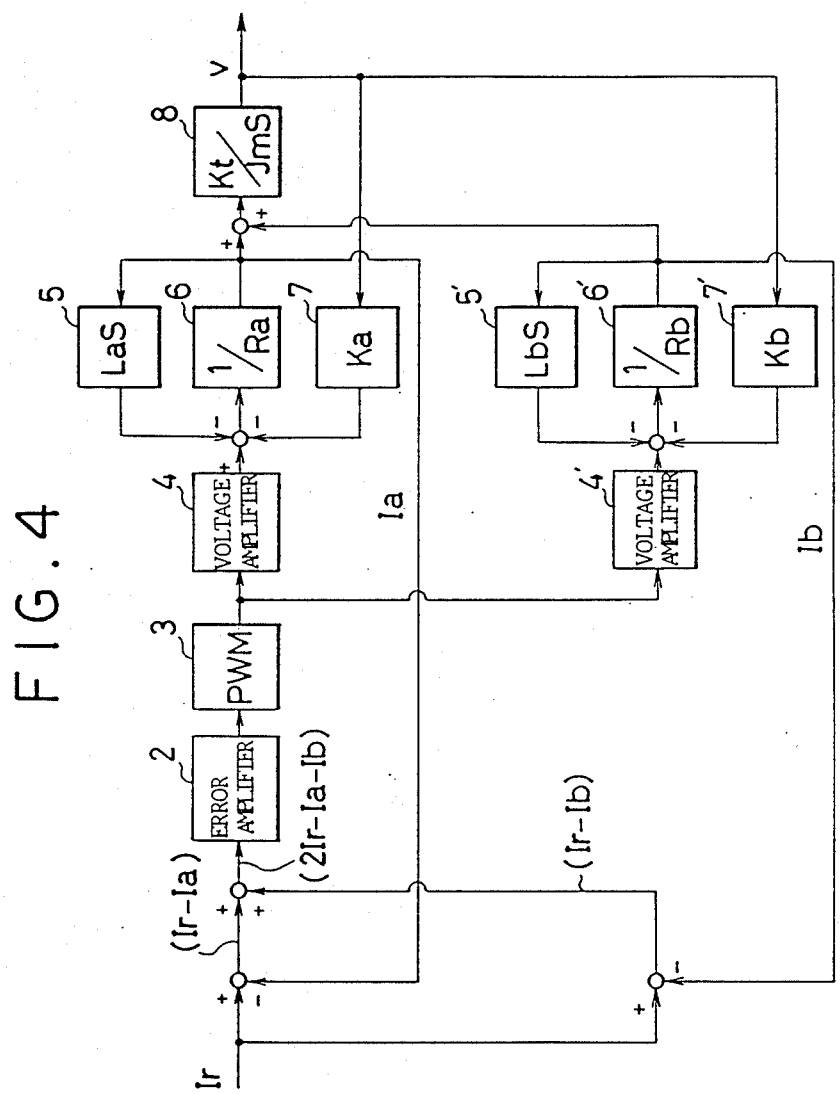
FIG. 4 is a block diagram showing a modification of the arrangement of FIG. 3 in which a PWM control section and the like are used in common.

Thereupon, an arrangement of FIG. 4 has been contrived in which the current control section shown in FIG. 3 is modified so that the error amplifier and the PWM control section 3 are used in common for the first and second winding portions.

Analyzing the block diagram of FIG. 4, we obtain the following eqs. (1) to (3):

$$\{(2Ir - Ia - Ib) \cdot G(S) \cdot Kv - Ia \cdot La \cdot S - V \cdot Ka\} \cdot (1/Ra) = Ia, \quad (1)$$

$$\{(2Ir - Ia - Ib) \cdot G(S) \cdot Kv - Ib \cdot Lb \cdot S - V \cdot Kb\} \cdot (1/Rb) = Ib, \quad (2)$$

$$(Ia + Ib) \cdot (Kt/Jm \cdot S) = V, \quad (3)$$

where G(S) is the transfer function of the error amplifier 2 and the PWM control section 3, and Kv is the transfer function of the voltage amplifiers 4 and 4'.

Rearranging eq. (1), we obtain $$(2Ir - Ib) \cdot G(S) \cdot Kv - Ka \cdot V = \{Ra + La \cdot S + G(S) \cdot Kv\} Ia. \quad (4)$$

Rearranging eq. (2), we obtain $$(2Ir - Ia) \cdot G(S) \cdot Kv - Kb \cdot V = \{Rb + Lb \cdot S + G(S) \cdot Kv\} Ib. \quad (5)$$

Substituting for eqs. (4) and (5) from eq. (3) and rearranging the resulting equations, we obtain the following eqs. (6) and (7).

$$(2Ir - Ib) \cdot G(S) \cdot Kv - Ka \cdot \frac{Ib \cdot Kt}{Jm \cdot S} = \quad (6)$$

$$\left\{ Ra + La \cdot S + G(S) \cdot Kv + \frac{Ka \cdot Kt}{Jm \cdot S} \right\} Ia,$$

$$(2Ir - Ia) \cdot G(S) \cdot Kv - Kb \cdot \frac{Ia \cdot Kt}{Jm \cdot S} = \quad (7)$$

$$\left\{ Rb + Lb \cdot S + G(S) \cdot Kv + \frac{Kb \cdot Kt}{Jm \cdot S} \right\} Ib.$$

Solving eqs. (6) and (7), we obtain $$\left\{ Ra + La \cdot S + \frac{Ka \cdot Kt}{Jm \cdot S} - \frac{Kb \cdot Kt}{Jm \cdot S} \right\} Ia = \quad (8)$$

$$\left\{ Rb + Lb \cdot S + \frac{Kb \cdot Kt}{Jm \cdot S} - \frac{Ka \cdot Kt}{Jm \cdot S} \right\} Ib.$$

As seen from eq. (8), the currents Ia and Ib flowing through the two winding portions are not independent of each other and are different from each other, with their ratios to the speed command Ir varying according to variations of parameters.

Based on the above consideration, the present invention is arranged so that the currents Ia and Ib flowing through the two winding portions are independent of each other. More specifically, integrating elements 9 and 9' (FIG. 1), each of which has a transfer function which is Ki/S, are arranged individually in the stages preceding the error amplifier 2, whereby the deviations between the command current Ir for the first and second winding portions and the currents Ia and Ib flowing through the winding portions are integrated. Also, the currents Ia and Ib flowing through the first and second winding portions are amplified, respectively, by proportional elements 10 and 10' whose transfer function is Kp. Further, the deviations between the outputs of the integrating elements 9 and 9' and the proportional elements 10 and 10' are obtained, and the sum total of these deviations is then supplied to the PWM control section 3 via the error amplifier 2.

Referring now to the block diagram of FIG. 1, an analysis will be made.

First, if the total transfer function of the error amplifier 2, PWM control section 3, and voltage amplifier 4 and that of the error amplifier 2, PWM control section 3, and voltage amplifier 4' are Kv(1) and Kv(2), respectively, the following eqs. (9) to (11) hold for the currents Ia and Ib flowing through the first and second winding portions.

$$\left[ \left\{ (Ir - Ia) \cdot \frac{Ki}{S} - Ia \cdot Kp + (Ir - Ib) \cdot \frac{Ki}{S} - Ib \cdot Kp \right\} \right. \quad (9)$$

$$\left. Kv(1) - Ia \cdot La \cdot S - V \cdot Ka \right] \cdot \frac{1}{Ra} = Ia,$$

$$\left[ \left\{ (Ir - Ia) \cdot \frac{Ki}{S} - Ia \cdot Kp + (Ir - Ib) \cdot \frac{Ki}{S} - Ib \cdot Kp \right\} \right. \quad (10)$$

-continued $$\left[Kv(2) - Ib \cdot Lb \cdot S - V \cdot Kb\right] \cdot \frac{1}{Rb} = Ib.$$

$$(Ia + Ib) \cdot (Kt/Jm \cdot S) = V. \tag{11}$$

Substituting for V of eq. (9) from the left side of eq. (11) and rearranging the resulting equation, we obtain the following eq. (12).

$$2Ir \cdot Kv(1) \cdot \frac{Ki}{S} - Ib\left\{Kv(1) \cdot \frac{Ki}{S} + Kp \cdot Kv(1) + \frac{Ka \cdot Kt}{Jm \cdot S}\right\} = Ia\left(Ra + \frac{Ki \cdot Kv(1)}{S} + La \cdot S + \frac{Ka \cdot Kt}{Jm \cdot S}\right). \tag{12}$$

Substituting for V of eq. (10) from the left side of eq. (11) and rearranging the resulting equation, moreover, we obtain the following eq. (13).

$$2Ir \cdot Kv(2) \cdot \frac{Ki}{S} - Ia\left\{Kv(2) \cdot \frac{Ki}{S} + Kp \cdot Kv(2) + \frac{Kb \cdot Kt}{Jm \cdot S}\right\} = Ib\left\{Rb + \frac{Ki \cdot Kv(2)}{S} + Lb \cdot S + \frac{Kb \cdot Kt}{Jm \cdot S}\right\}. \tag{13}$$

Here if we have Kv(1), Kv(2)>>1 and Kv(1)=Kv(2)=Kv, eq. (12) can be approximated by the following eq. (14).

$$2Ir \cdot Kv \cdot \frac{Ki}{S} = Ia\left(Ra + \frac{Ki \cdot Kv}{S} + La \cdot S + \frac{Ka \cdot Kt}{Jm \cdot S}\right) + Ib\left(Kv \cdot \frac{Ki}{S} + Kp \cdot Kv + \frac{Ka \cdot Kt}{Jm \cdot S}\right). \tag{14}$$

Likewise, eq. (13) can be approximated by the following eq. (15).

$$2Ir \cdot Kv \cdot \frac{Ki}{S} = Ia\left(Kv \cdot \frac{Ki}{S} + Kp \cdot Kv + \frac{Kb \cdot Kt}{Jm \cdot S}\right) + Ib\left(Rb + \frac{Ki \cdot Kv}{S} + Lb \cdot S + \frac{K^b \cdot Kt}{Jm \cdot S}\right). \tag{15}$$

Since the respective left sides of eqs. (14) and (15) are identical, the following eq. (16) holds true.

$$Ia\left(Ra + \frac{Ki \cdot Kv}{S} + La \cdot S + \frac{Ka \cdot Kt}{Jm \cdot S}\right) + \tag{16}$$

$$Ib\left(Kv \cdot \frac{Ki}{S} + Kp \cdot Kv + \frac{Ka \cdot Kt}{Jm \cdot S}\right) =$$

$$Ia\left(Kv \cdot \frac{Ki}{S} + Kp \cdot Kv + \frac{Kb \cdot Kt}{Jm \cdot S}\right) +$$

$$Ib\left(Rb + \frac{Ki \cdot Kv}{S} + Lb \cdot S + \frac{Kb \cdot Kt}{Jm \cdot S}\right).$$

Since Ki·Kv/S is used in common for both sides of eq. (16), the following equation can be obtained by rearranging eq. (16).

$$Ia\left(Ra + La \cdot S + \frac{Ka \cdot Kt}{Jm \cdot S}\right) + Ib\left(Kp \cdot Kv + \frac{Ka \cdot Kt}{Jm \cdot S}\right) = \tag{17}$$

$$Ia\left(Kp \cdot Kv + \frac{Kb \cdot Kt}{Jm \cdot S}\right) + Ib\left(Rb + Lb \cdot S + \frac{Kb \cdot Kt}{Jm \cdot S}\right).$$

Further rearranging eq. (17), we obtain $$Ia\left(Ra + La \cdot S + \frac{Ka \cdot Kt}{Jm \cdot S} - Kp \cdot Kv - \frac{Kb \cdot Kt}{Jm \cdot S}\right) = \tag{18}$$

$$Ib\left(Rb + Lb \cdot S + \frac{Kb \cdot Kt}{Jm \cdot S} - Kp \cdot Kv - \frac{Ka \cdot Kt}{Jm \cdot S}\right).$$

Here if Kp·Kv>>1, and if other parameters are negligible, we obtain $$Ia \approx Ib. \tag{19}$$

Figure 1:
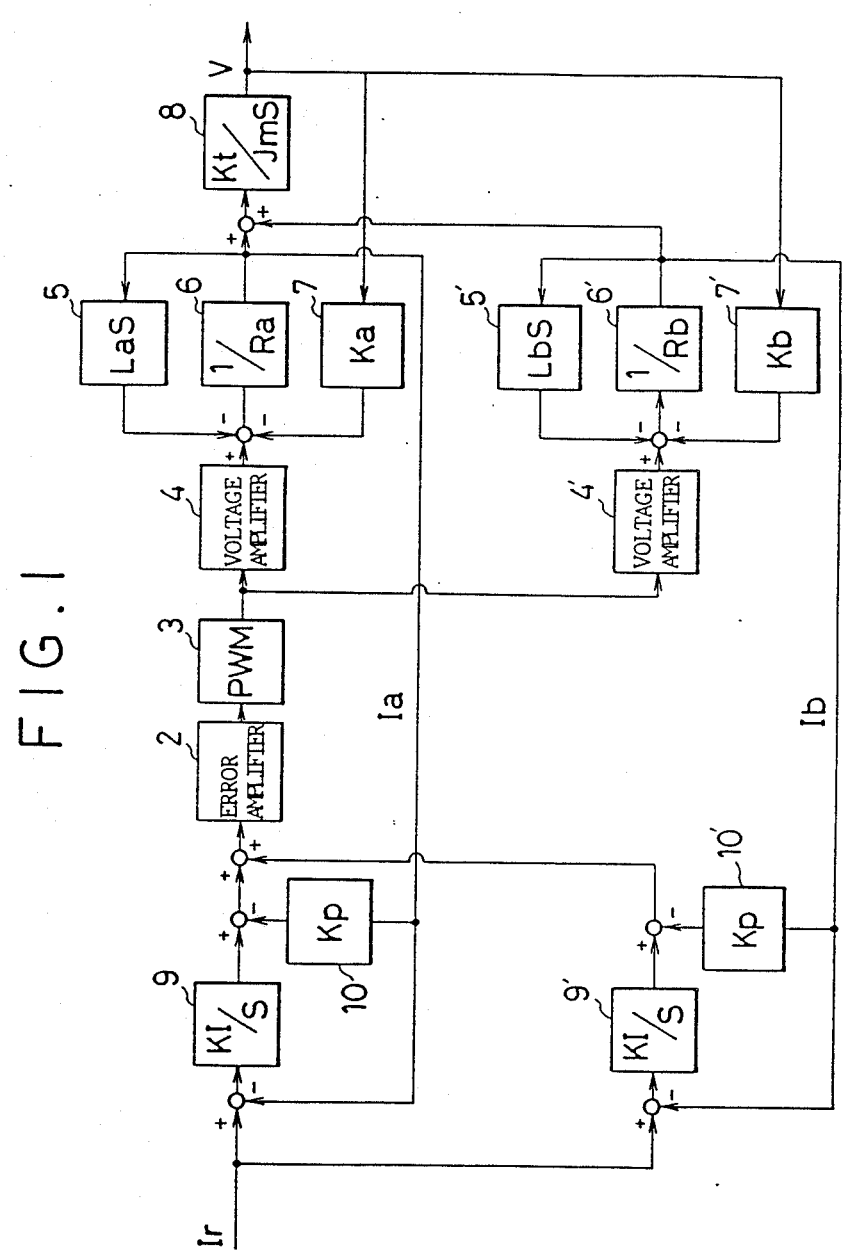
FIG. 1 is a block diagram of a motor-current control unit to which is applied a method for controlling a servomotor according to an embodiment of the present invention.

If the proportional constant Kv of the transfer function of the elements 2 to 4 and 2 to 4' and the proportional constant Kp of the transfer function of the interposed proportional elements 10 and 10', as shown in FIG. 1, are made greater than the other parameters, at least the PWM control section 3 can be used in common for the two winding portions. Also, the currents Ia and Ib flowing through the individual winding portions have substantially independent and equal values. Accordingly, the rotor of the servomotor is rotated by substantially equal rotational forces which are attributable to the currents flowing through the two winding portions. Thus, the servomotor can produce a large output torque.

Although the DC servomotor has been described in connection with the above embodiment, an AC servomotor may be used with the same result.

What is claimed is:

1. A method of controlling a servomotor, comprising steps of:
    (a) integrating the deviation between a command current for each of a plurality of independent winding portions and a current flowing through each of the winding portions, by means of integrating elements respectively corresponding to the winding portions, the plurality of winding portions cooperating with each other to form armature windings of respective phases of the servomotor;
    (b) amplifying the currents flowing through the individual winding portions by means of proportional elements respectively corresponding to the individual winding portions;
    (c) obtaining the deviations between the outputs of the individual integrating elements and the outputs of the proportional elements corresponding thereto;

(d) obtaining a control signal by adding the individual deviations; and (e) controlling the currents supplied to the individual winding portions for substantially independent and equal values by the use of one PWM control means responsive to the control signal.

2. A method according to claim 1, wherein the proportional elements each have a transfer function which includes a proportional constant, wherein the PWM control means has a transfer function with a proportional constant, wherein the individual winding portions have transfer functions including parameters, and wherein the proportional constants of the transfer functions of the proportional elements, and the proportional constant of the transfer function of the PWM control means are set individually to values greater than the parameters of the transfer functions of the individual winding portions.

3. A method according to claim 2, wherein the parameters of the transfer functions of the individual winding portions are resistances, inductances and electromotive force constants of the individual winding portions, a torque constant, and a combined moment of intertia of the servomotor and a load.

4. A method of controlling a servomotor, comprising steps of:

(a) integrating a deviation between a command current for each of first and second winding portions, which are independent from each other, and a current flowing through each of the first and second winding portions, said integrating step being performed by first and second integrating elements which respectively correspond to the first and second winding portions, the first and second winding portions forming armature windings of indivudal phases of a servomotor;

(b) amplifying the currents respectively flowing through the first and second winding portions by means of first and second proportional elements which respectively correspond to the respective first and second winding portions;

(c) obtaining deviations between outputs of the first and second integrating elements and outputs of the first and second proportional elements;

(d) obtaining a control signal by adding the deviations; and (e) controlling the current supplied to the first and second winding portions for substantially independent and equal values by the use of PWM control means responsive to the control signal.

5. A method according to claim 4, wherein the first and second proportional elements have transfer functions including proportional constants, wherein the PWM control means has a transfer function including a proportional constant, wherein the first and second winding portions have transfer functions including parameters, and wherein the proportional constants of the transfer functions of the first and second proportional elements and the proportional constant of the transfer function of the PWM control means are set to values greater than the parameters of the transfer functions of the first and second winding portions.

6. A method according to claim 5, wherein the parameters of the transfer functions of the individual winding portions are resistances, inductances and electromotive force constants of the individual winding portions, a torque constant, and a combined moment of inertia of the servomotor and a load.

* * * * *